United States Patent
Lee

(10) Patent No.: US 8,344,571 B2
(45) Date of Patent: Jan. 1, 2013

(54) HIGH-EFFICIENCY PERMANENT MAGNET MOTOR

(76) Inventor: I-Soo Lee, Gyeongsangnam-do (KR)

(*) Notice: Subject to any disclaimer, the term of this patent is extended or adjusted under 35 U.S.C. 154(b) by 149 days.

(21) Appl. No.: 12/997,256

(22) PCT Filed: May 28, 2009

(86) PCT No.: PCT/KR2009/002842
§ 371 (c)(1),
(2), (4) Date: Dec. 10, 2010

(87) PCT Pub. No.: WO2009/151222
PCT Pub. Date: Dec. 17, 2009

(65) Prior Publication Data
US 2011/0089783 A1    Apr. 21, 2011

(30) Foreign Application Priority Data
Jun. 13, 2008  (KR) .................. 10-2008-0055761

(51) Int. Cl.
*H02K 31/00*  (2006.01)
(52) U.S. Cl. ................... 310/178; 310/114; 310/268
(58) Field of Classification Search ............ 310/71, 310/178, 114, 268, 254.1
See application file for complete search history.

(56) References Cited

U.S. PATENT DOCUMENTS

| | | | | |
|---|---|---|---|---|
| 5,334,898 A * | 8/1994 | Skybyk | | 310/268 |
| 6,590,312 B1 * | 7/2003 | Seguchi et al. | | 310/266 |
| 7,309,938 B1 * | 12/2007 | Smith | | 310/113 |
| 7,732,973 B2 * | 6/2010 | Bojiuc | | 310/268 |

FOREIGN PATENT DOCUMENTS
JP    2006238623    9/2006

OTHER PUBLICATIONS
International Search Report for PCT/KR2009/002842, mailed Jan. 18, 2011.

* cited by examiner

Primary Examiner — Thanh Lam
(74) Attorney, Agent, or Firm — Design IP

(57) ABSTRACT

The present invention relates to a high-efficiency permanent magnet motor driven by a direct current (DC) without alternation, with the motor generating a high-efficiency kinetic energy synthesized from active energy of a stator and passive energy of a rotator, comprising: a stator comprising a coil distributively wound radially around a circular planar PCB, creating a magnetic field on both sides of the stator located at the center of two rotators; and a rotor comprising two circular planar permanent magnets with a corresponding size to the magnetic field of the stator, with the magnet having both faces magnetized arranged such that the magnetized faces of the magnets and the magnetic fields on both sides of the stator facing each other have the same polarity. Constant power is provided when DC power is applied to the coil of the stator, the rotor rotates, in the absence of an AC.

1 Claim, 5 Drawing Sheets

HIGH-EFFICIENCY PERMANENT MAGNET MOTOR

BACKGROUND OF THE INVENTION

1. Field of the Invention

The present invention relates to a permanent magnet motor, and more particularly, to a high-efficiency permanent magnet motor driven by a direct current (DC) without alternation, with the motor generating a high-efficiency kinetic energy synthesized from active energy of a stator and passive energy of a rotator.

2. Description of the Related Art

In recent, as energy problems due to sharp rises in oil prices are getting serious, development of high-efficiency motors capable of significantly reducing energy consumption is urgently needed. To develop high-efficiency motors, a high-efficiency permanent magnet motor utilizing a neodymium magnet ($NdFe_{14}B_1$) that is a strong permanent magnet should be developed. The neodymium magnet is manufactured by magnetizing a sintered magnetic substance, which is manufactured by mixing boron power, iron power, and neodymium power with each other and then performing powder metallurgy on the mixture. The neodymium magnet is a very strong rare earth metal magnet.

It is urgently needed to develop a brushless type constant-power motor as a preferable motor. The constant-power motor may be driven without alternation, realize a linear torque scheme, have a strong stall-torque, and be operated without being limited to a high-speed. Also, the constant-power motor should be manufactured without being restricted to available fields from micro-motors to power motors. In addition, a traction motor or a propulsion motor should be achieved as a direct drive pan-cake motor. Specifically, an immersible motor for submarine development should be achieved, and furthermore, manufacturing costs should be reduced.

SUMMARY OF THE INVENTION

Accordingly, the present invention is directed to a high-efficiency permanent magnet motor that substantially obviates one or more problems due to limitations and disadvantages of the related art.

An object of the present invention is to provide a high-efficiency permanent magnet motor driven by a direct current (DC) without alternation, with the motor generating a high-efficiency kinetic energy synthesized from active energy of a stator and passive energy of a rotator.

According to an aspect of the present invention, there is provided a high-efficiency permanent magnet motor including: a stator including a coil distributively wound radially around a circular planar PCB to create a magnetic field on both sides of the stator and located at a center of two rotors; a rotor including two circular planar permanent magnets with a corresponding size to the magnetic field of the stator, with the magnet having both faces magnetized to be arranged in a manner that the magnetized faces of the magnets and the magnetic fields on both sides of the stator facing each other have the same polarity, wherein, when DC power is applied to the coil of the stator, the rotor starts rotating without alternation in a rotating direction given by Fleming's left-hand rule to provide a constant power.

DETAILED DESCRIPTION OF THE INVENTION

Technical objectives of the present invention will become evident through the following embodiments. The following embodiments are merely illustrative of the present invention, and thus, this should not be construed as limited to the scope of the present invention.

Figure 1:
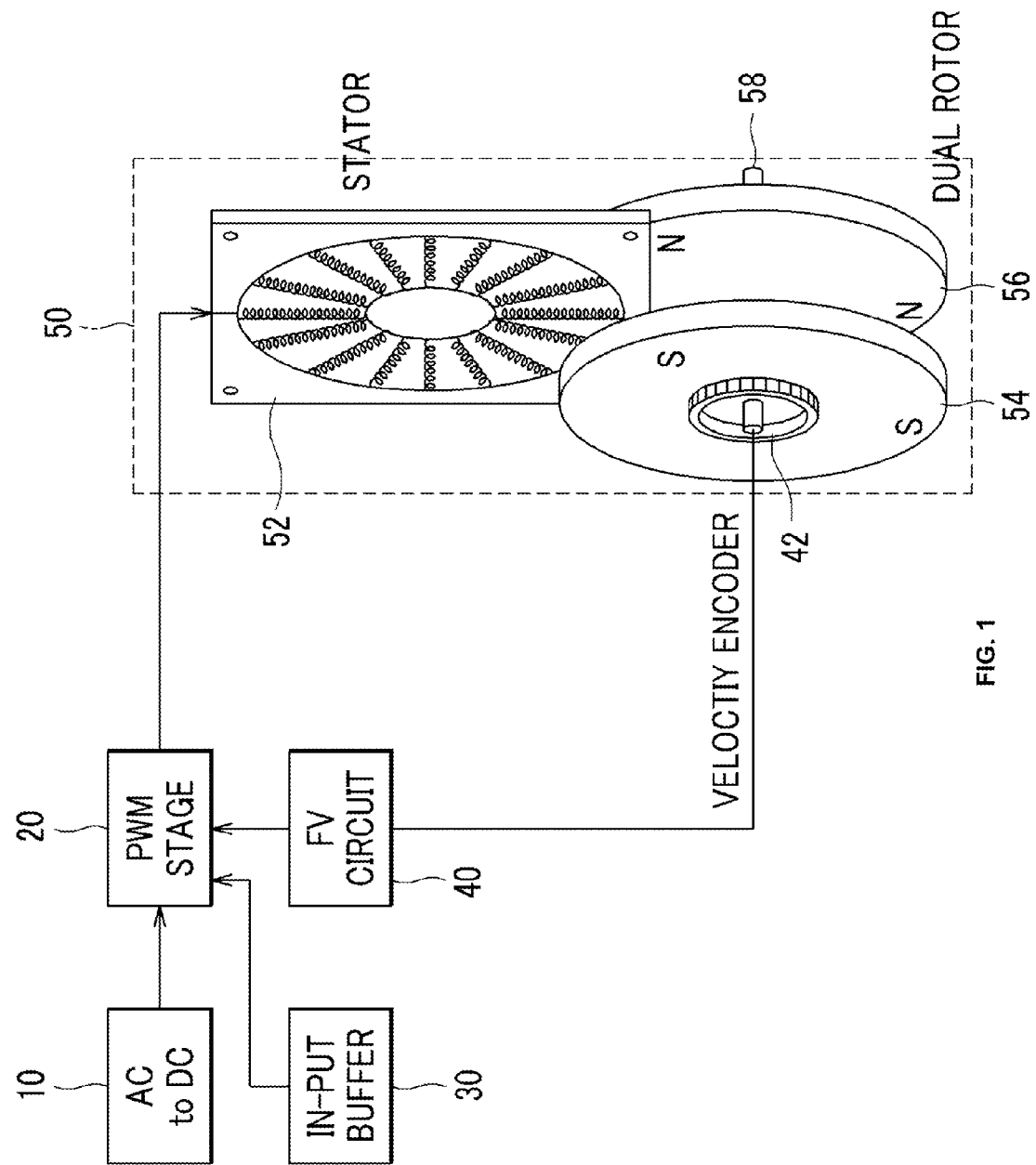
FIG. 1 is a schematic view illustrating an overall structure of a high-efficiency permanent magnet motor according to the present invention.

FIG. 1 is a schematic view illustrating an overall structure of a high-efficiency permanent magnet motor according to the present invention.

Referring to FIG. 1, a high-efficiency permanent magnet motor system according to the present invention includes a power supply 10 for converting an AC power into a DC power, an input buffer 30 for inputting a user control command, a frequency velocity (FV) control circuit 40, and a PWM stage 20 for PWN-driving a high-efficiency permanent magnet motor according to controls of the input buffer 30 and the FV control circuit 40. The high-efficiency permanent magnet motor 50 has a structure in which one rotor 52 is disposed between two permanent magnet stators 54 and 56. Also, an encoder 42 for detecting a speed is attached to a rotation shaft 58 of the motor. The encoder 42 is connected to the FV control circuit 40.

Figure 2:
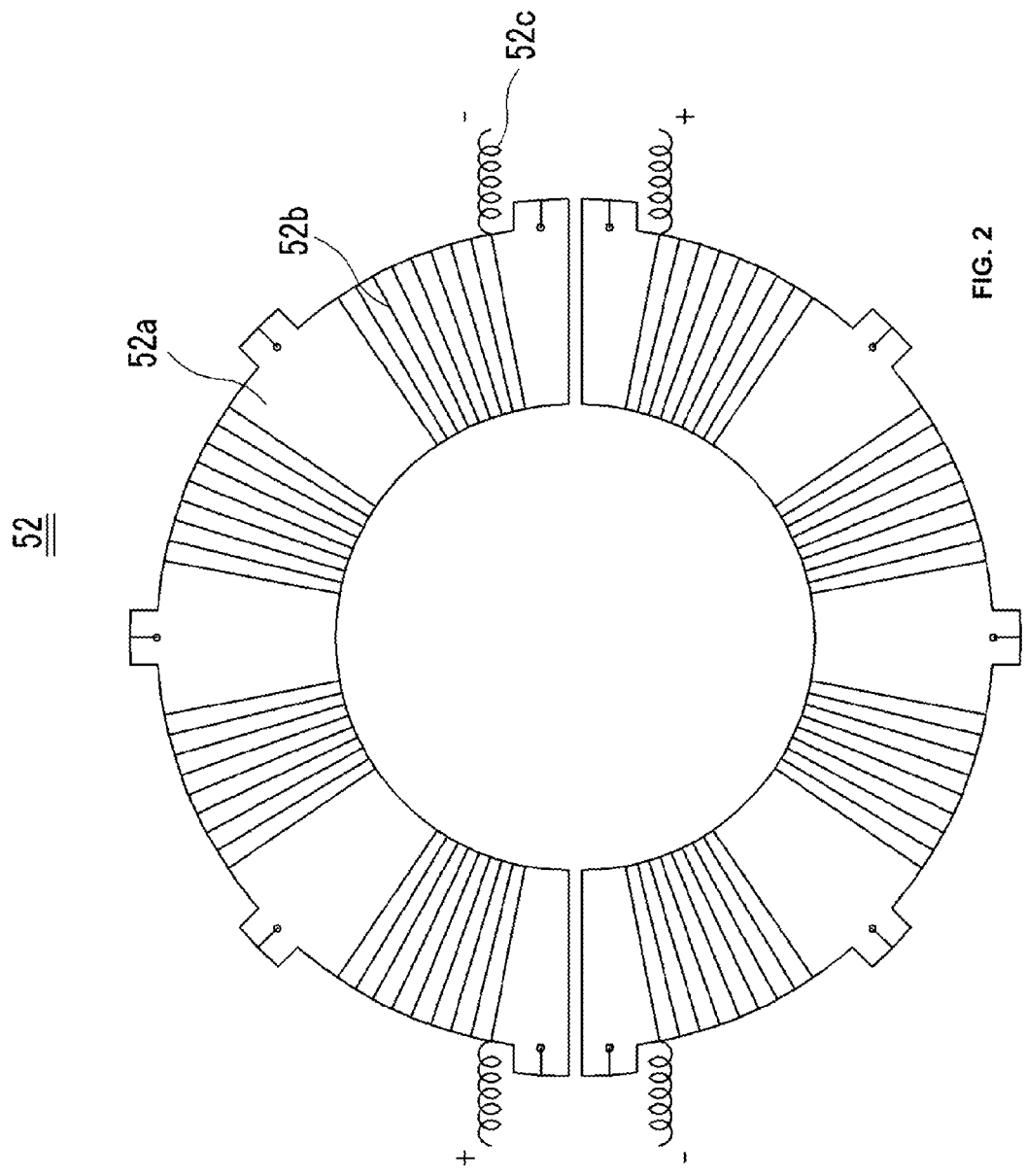
FIG. 2 is a view illustrating a stator of the high-efficiency permanent magnet motor according to the present invention.

FIG. 2 is a view illustrating a stator of the high-efficiency permanent magnet motor according to the present invention.

As shown in FIG. 2, the rotor 52 used in the permanent magnet motor of the present invention has a structure in which a coil 42*a* is wound around a circular planar PCB 52*a* which has a circular structure and a shape similar to that a doughnut is divided into two parts and the circular planar PCB 52*a* is electrically connected to a +/− power sources of the PWM stage 20 through a lead line 52*c*. Here, a power is applied to an upper winding coil and a lower winding coil in directions different from each other.

Referring to FIG. 2, in the stator 52, the coil 52*b* is distributively wound radially around the circular planar PCB 52*a* to create a magnetic field on both sides of the stator 52. The stator 52 is located at a center between two rotors 54 and 56.

Figure 3:
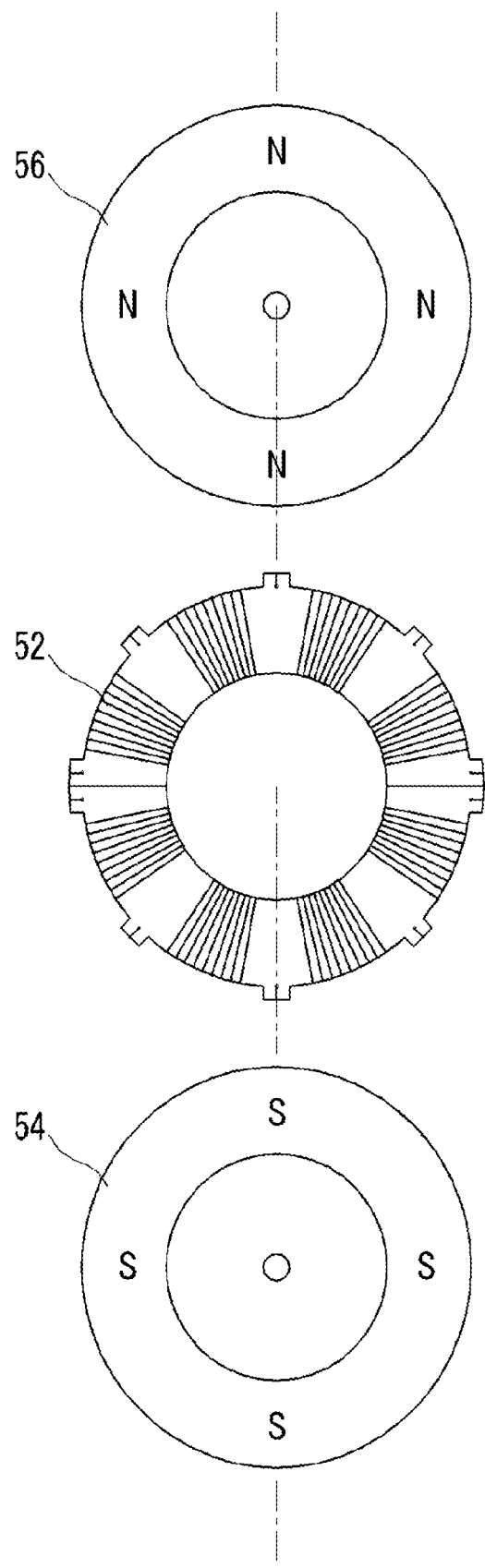
FIG. 3 is a view illustrating a rotor of the high-efficiency permanent magnet motor according to the present invention.

FIG. 3 is a view illustrating a rotor of the high-efficiency permanent magnet motor according to the present invention.

As shown in FIG. 3, the rotors 54 and 56 used in the permanent magnet motor has a structure in which two neodymium magnets face each other and have polarities different from each other with the stator 52 therebetween. An S pole of the first permanent magnet rotor 54 faces the stator 52, and an N pole of the second permanent magnet rotor 56 faces the stator 52. Thus, the first rotor 54 and the second rotor 56 face each other in the S pole and N pole.

Referring to FIG. 3, the two rotors 54 and 56 includes two circular planar permanent magnets with a corresponding size to the magnetic field of the stator. Here, the rotors 54 and 56 includes neodymium permanent magnets having both faces magnetized to be arranged in a manner that the magnetized faces of the magnets and the magnetic fields on both sides of the stator facing each other have the same polarity. The magnetic field of each of the rotors 54 and 56 faces the magnetic field of both sides of the stator 52. Here, the same polarity of each of the rotors 54 and 56 faces the magnetic field of the both sides of the stator 52.

As such, when DC power is applied to the stator 52, the rotor starts rotating without alternation. Here, a rotation direction of the rotors 54 and 56 is given by Fleming's left-hand rule.

Thus, according to the present invention, since a constant-power motor is achieved, the high-efficiency permanent magnet may be realized.

Figure 4:
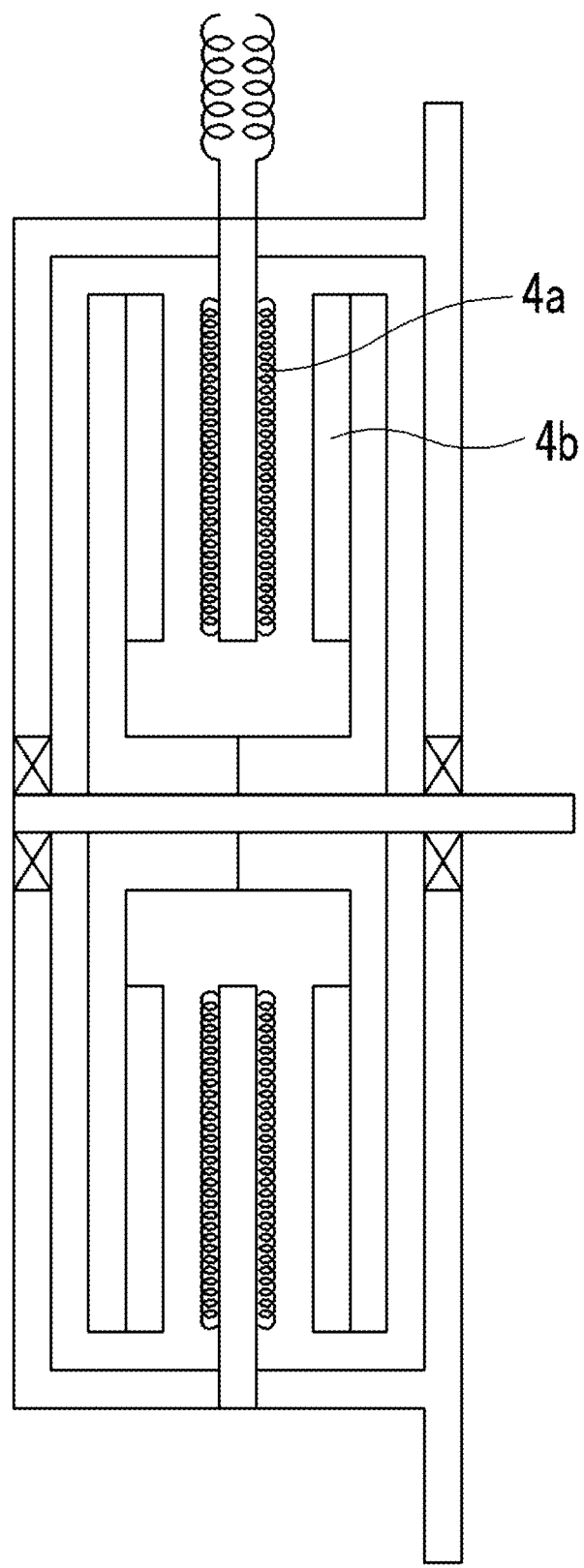
FIG. 4 is a schematic view of an inner rotor motor in the high-efficiency permanent magnet motor according to the present invention.
Figure 5:
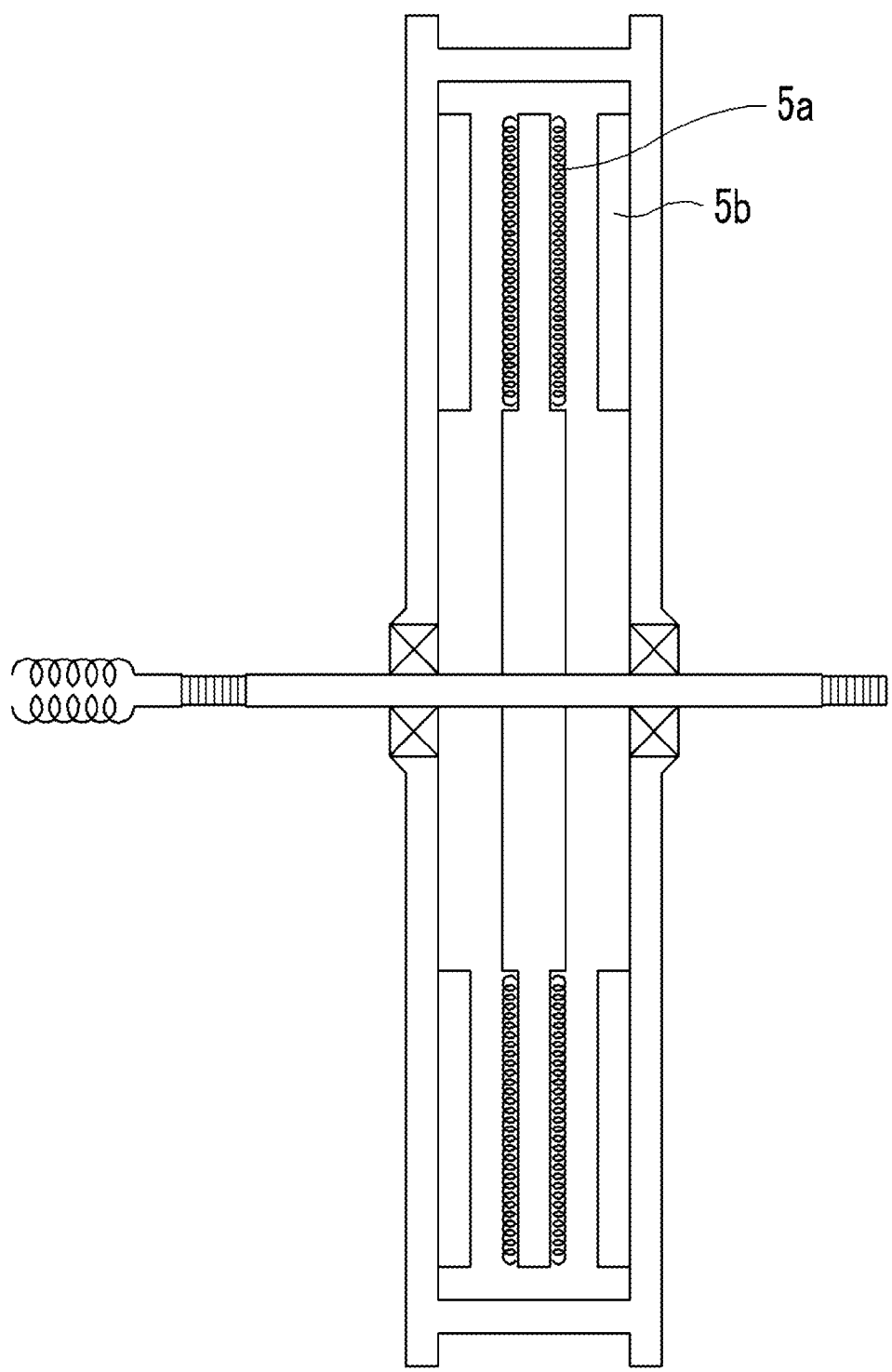
FIG. 5 is a schematic view of an outer rotor motor in the high-efficiency permanent magnet motor according to the present invention.

FIG. 4 is a schematic view of an inner rotor motor in the high-efficiency permanent magnet motor according to the present invention, and FIG. 5 is a schematic view of an outer rotor motor in the high-efficiency permanent magnet motor according to the present invention.

Referring to FIGS. 4 and 5, a reference numeral 4a represents a winding coil of the inner rotor motor, and a reference numeral 4b represents a permanent magnet. Also, a reference numeral 5a represents a winding coil of the outer rotor motor, and a reference numeral 5b represents a permanent magnet.

The high-efficiency permanent magnet motor according to the present invention has following effects.

1. The high-efficiency permanent magnet motor may not cause problems such as reactance, harmonics, and eddy current.

2. The high-efficiency permanent magnet motor may be a linear torque scheme motor without torque ripple.

3. The high-efficiency permanent magnet motor may not cause copper losses or iron losses.

4. The high-efficiency permanent magnet motor may be rotated at a high speed without advanced commutation because hysteresis losses do not occur.

5. The high-efficiency permanent magnet motor may be a constant-power motor, which is driven at a high speed by a high stall torque.

6. The high-efficiency permanent magnet motor may be an over-unity energy motor.

7. According to the present invention, a pan-cake type motor may be easily manufactured.

8. According to the present invention, an immersible motor may be easily manufactured.

9. According to the present invention, a silicon steel material may be reduced.

10. The high-efficiency permanent magnet motor may not have an idle coil.

11. According to the present invention, since an interconnection does not exist, the number of processes may be reduced to reduce personnel expenses.

12. According to the present invention, since a commutator of a switching state does not exist, manufacturing costs may be reduced.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A high-efficiency permanent magnet motor, comprising:
a stator comprising a coil distributively wound radially around a circular planar PCB to create a magnetic field on both sides of the stator and located at a center of two rotors;
a rotor comprising two circular planar permanent magnets with a corresponding size to the magnetic field of the stator, with the magnet having both faces magnetized to be arranged in a manner that the magnetized faces of the magnets and the magnetic fields on both sides of the stator facing each other have the same polarity,
wherein, when DC power is applied to the coil of the stator, the rotor starts rotating without alternation in a rotating direction given by Fleming's left-hand rule to provide a constant power.

* * * * *